(12) United States Patent
Platz et al.

(10) Patent No.: US 8,597,491 B2
(45) Date of Patent: Dec. 3, 2013

(54) PROCEDURE FOR THE PRODUCTION AND APPLICATION OF A PROTECTIVE LAYER

(75) Inventors: Albin Platz, Ried-Baindlkirch (DE); Natividad Lopez Lavernia, Munich (DE)

(73) Assignee: MTU Aero Engines AG, Munich (DE)

( * ) Notice: Subject to any disclaimer, the term of this patent is extended or adjusted under 35 U.S.C. 154(b) by 594 days.

(21) Appl. No.: 12/392,564

(22) Filed: Feb. 25, 2009

(65) Prior Publication Data

US 2009/0211921 A1    Aug. 27, 2009

(30) Foreign Application Priority Data

Feb. 27, 2008    (DE) .......................... 10 2008 011 427

(51) Int. Cl.
- *B23H 3/00* (2006.01)
- *C25F 3/02* (2006.01)

(52) U.S. Cl.
USPC .......................................... 205/666; 205/640

(58) Field of Classification Search
USPC ....................................................... 205/640
See application file for complete search history.

(56) References Cited

U.S. PATENT DOCUMENTS

| | | | |
|---|---|---|---|
| 3,566,493 A * | 3/1971 | Poucher et al. | 29/889.71 |
| 4,997,534 A * | 3/1991 | Thornton | 428/469 |
| 5,244,548 A * | 9/1993 | Bruns et al. | 428/598 |
| 5,310,468 A * | 5/1994 | Bruns et al. | 204/297.05 |
| 5,479,704 A * | 1/1996 | Richter et al. | 29/889.1 |
| 2007/0248750 A1 * | 10/2007 | Allen | 427/180 |
| 2008/0202938 A1 * | 8/2008 | Rao et al. | 205/234 |
| 2009/0008265 A1 * | 1/2009 | Bayer et al. | 205/654 |

FOREIGN PATENT DOCUMENTS

| | | | |
|---|---|---|---|
| EP | 0079754 A2 * | 5/1983 | |
| WO | WO 2006012852 A1 * | 2/2006 | |

OTHER PUBLICATIONS

Wang et al., "Principles and Application of Electrolytic Machining", National Defence Industry Press, Beijing, 2001.*

* cited by examiner

*Primary Examiner* — Nicholas A Smith
*Assistant Examiner* — Brian W Cohen
(74) *Attorney, Agent, or Firm* — Howison & Arnott, L.L.P.

(57) ABSTRACT

The invention at hand relates to a method for processing and repairing a metal component with at least one finished or nearly finished partial component surface and at least one working surface to be further processed by means of an electrochemical treatment process and abutting the at least one finished or nearly finished partial component surface, with the process comprising the following steps: a) application of an electrically conductive layer on at least one area of the at least one finished or nearly finished partial component surface abutting the working surface to be processed, with the layer containing a metal or a metal alloy that has a similar or the same as, or a desiredly different electrochemical erosion behavior than the metal component; and b) electrochemical treatment of the working surface and of the layer, with the layer being completely or nearly completely eroded. The invention moreover relates to a component of a gas turbine or of a high or low pressure compressor.

7 Claims, 2 Drawing Sheets

PROCEDURE FOR THE PRODUCTION AND APPLICATION OF A PROTECTIVE LAYER

CROSS-REFERENCE TO RELATED APPLICATIONS

This application claims the benefit of German Application Serial No. DE 10 2008 011 427.8, filed Feb. 27, 2008, and entitled "VERFAHREN ZUR HERSTELLUNG UND ANWENDUNG EINER SCHUTZSCHICHT" (translated to "PROCEDURE FOR THE PRODUCTION AND APPLICATION OF A PROTECTIVE LAYER"), the specification of which is incorporated herein by reference in its entirety.

TECHNICAL FIELD

The invention at hand relates to a process for processing and repairing a metal component with at least one finished or nearly finished partial component surface and at least one working surface to be further processed by means of an electrochemical treatment procedure and abutting the at least one finished or nearly finished partial component surface. The invention moreover relates to a component produced by means of the method in accordance with the invention as well as to the use of the process in accordance with the invention.

BACKGROUND

Processes for the electrochemical processing of a component with at least one electrode have been known. For example, the so-called electrochemical sinking process is an example of a process to exactly and highly precisely finish surfaces. In electrochemical sinking, the surface of the component is processed, as a rule, with at least one electrode, with a removal of material occurring to the component due to an electrochemical reaction of the component with the electrolyte located between the component and the electrode. However, a disadvantage of the known electrochemical sinking processes is that, for example, in the sinking of components of a gas turbine or of a low or high pressure compressor, finished partial component surfaces that already have the required final contours are corroded by the electrochemical process and are partially eroded. The erosion leads to an undesirable change of the geometry, to the effect that, as a rule, blueprint tolerances are exceeded. Such inaccuracies are undesirable, particularly in turbine engineering. In particular, they prevent any further automatization in the production process of the aforementioned components from being achieved.

SUMMARY

Therefore it is the objective of the invention at hand to provide a process for the processing and repairing of a metal component with at least one already finished or nearly finished partial component surface and at least one working surface to be further finished by means of an electrochemical finishing process and abutting the at least one already finished or nearly finished partial component surface that assures reliable protection of the already finished or nearly finished partial component surface from any undesirable electrochemical machining (i.e., electro-erosion) on the component to be processed.

Another objective of the invention at hand is to provide a component of a gas turbine or of a low or high pressure compressor that can be manufactured relatively simply and fast, in particular by means of automatization.

The present invention disclosed and claimed herein comprises, in one aspect thereof, a process for processing or repairing a metal component having a known electrochemical erosion behavior and including at least one substantially finished partial component surface and at least one working surface to be further processed by an electrochemical processing method and abutting the substantially finished partial component surface. The process comprises the following steps: a) application of an electrically conductive protective layer on at least one area of the substantially finished partial component surface abutting the working surface to be further processed, where the protective layer contains one of a metal, a metal alloy or any other electrically conductive material having an electrochemical erosion behavior that has a known relation to the electrochemical erosion behavior of the metal component; and b) electrochemical processing of the working surface and of the protective layer, with the protective layer being substantially completely eroded in a predetermined region.

The present invention disclosed and claimed herein comprises, in another aspect thereof, a process for one of manufacturing and repairing a metal component of a rotating machine such as a gas turbine, a high pressure compressor or a low pressure compressor, the metal component having a known electrochemical erosion behavior and including a first section with abutting surfaces defining a joint and a second section having a substantially finished surface disposed adjacent to the first section. The process comprises the following steps: a) permanent joining of the abutting surfaces defining the joint to one another, whereby a first joint contour is created on the surface of the first section; b) application of an electrically conductive protective layer on at least one area of the second section adjacent the first section, with the protective layer containing one of a metal, a metal alloy or any other electrically conductive material having an electrochemical erosion behavior that has a known relation to the electrochemical erosion behavior of the metal component; and c) electrochemical processing of the first section and of the protective layer, with the first joint contour being eroded to define a second joint contour and the protective layer being substantially completely eroded in at least one region.

The present invention disclosed and claimed herein comprises, in yet another aspect thereof, a component of a rotating machine such as a gas turbine, a high pressure compressor or a low pressure compressor, the component having a known electrochemical erosion behavior. The component comprises at least one section repaired by joining, a first section having a later-finished surface, and a second section having an earlier-finished surface disposed adjacent to the first section over which an electrically conductive protective layer has been applied. The protective layer contains one of a metal, a metal alloy or any other electrically conductive material having an electrochemical erosion behavior that has a known relation to the electrochemical erosion behavior of the component. The protective layer has been substantially completely eroded in at least one area of the second section during electrochemical processing that also eroded a previous surface of the first section to form the later-finished surface.

BRIEF DESCRIPTION OF THE DRAWINGS

In the following, preferred embodiments of the invention will be described with reference to the drawings in which.

DETAILED DESCRIPTION

Figure 1:
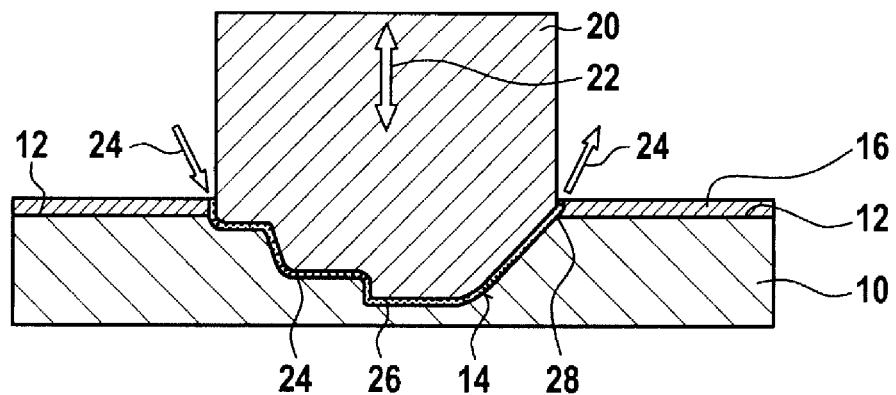
FIG. 1 illustrates schematically the process in accordance with the invention in a first embodiment.

Referring now to the drawings, wherein like reference numbers are used herein to designate like elements throughout, the various views and embodiments of a process for the production and use of a protective layer are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Figure 2:
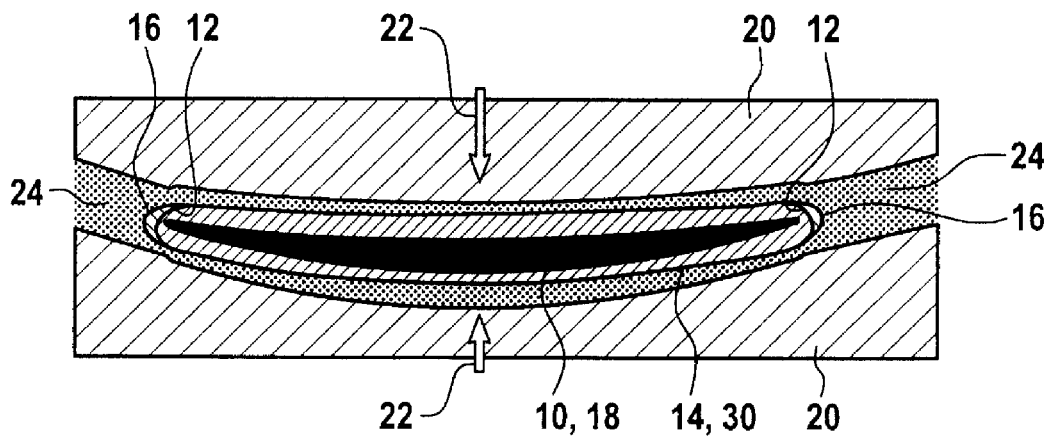
FIG. 2 illustrates schematically the process in accordance with the invention in a second embodiment.
Figure 3:
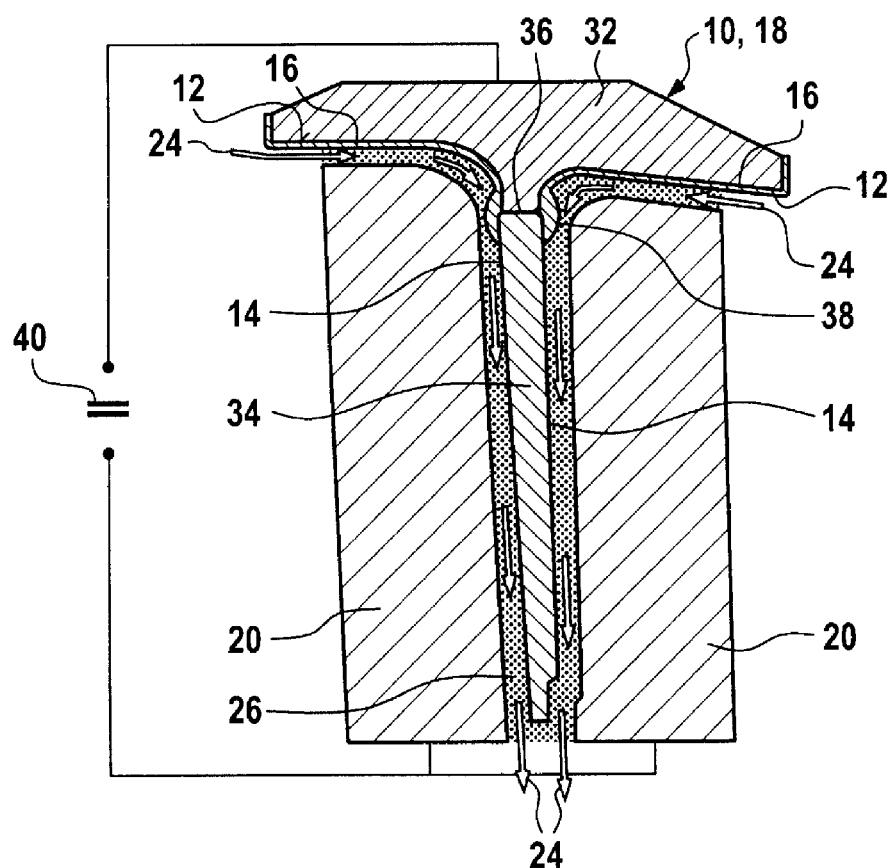
FIG. 3 illustrates schematically the process in accordance with the invention in a third embodiment.

Referring now generally to FIGS. 1-3, there is illustrated a method for processing and repairing a metal component with at least one already finished or nearly finished partial component surface and at least one finishing surface to be further finished by means of an electrochemical finishing process and abutting the at least one already finished or nearly finished partial component surface comprises the following steps: a) application of an electrically conductive layer on at least one area of the at least one finished or nearly finished partial component surface abutting the surface to be processed, with the layer containing a metal or a metal alloy or any other electrically conductive material that has a similar or the same as, or a specifically different electrochemical machining (i.e., electro-erosion) behavior than the metal component; and b) electrochemical treatment of the surface to be processed and of the layer, with the layer being completely or nearly completely removed/eroded.

The application of a layer that has a similar or the same as, or a specifically different electrochemical machining/electro-erosion behavior than the component to be processed makes the processing of yet to be processed working surfaces possible without impacting on any abutting areas that have already been processed and that are to be protected. Moreover, the complete or nearly complete removal of the layer during process step b) results in a seamless transition between the working surface to be processed and the abutting areas of the already finished partial component surface or, respectively, surfaces that is or are to be protected. The electrochemical processing methods may involve in particular pulsed on non-pulsed electrochemical sinking processes or electrochemical drilling processes.

In additional advantageous embodiments of the process in accordance with the invention, the layer is preferably made of an alloy based on nickel, cobalt, iron or titanium. But other metals and metal alloys that have a similar or the same behavior as the metal component to be processed are usable. The component may be made, for example, of an alloy based on nickel, cobalt, iron or titanium. Moreover, the layer may have a thickness of between 1 μm and 2 mm. The thickness of the layer depends in particular on the scope and the duration of the electrochemical treatment of the working surface in accordance with process step b) and is selected in such a way that the finished or nearly finished component surfaces will not be subjected to any further electrochemical machining/electro-erosion.

In additional advantageous embodiments of the process in accordance with the invention, the application of the layer in accordance with process step a) occurs by means of varnishing or a thermal spray process. The thermal spray process may be an arc spray process, a flame spray process, an atmospheric plasma spray process or a high-speed flame spray process and vacuum plasma spraying ("VPS") and protective gas plasma spraying ("PS"). But it is also possible that the application of the metal layer in accordance with process step a) occurs by means of a cold-gas spray process or by way of applying a metallic slurry with subsequent thermal treatment. A galvanic application of the layer is possible as well.

A structural element of a gas turbine or of a low or high pressure compressor in accordance with the invention has at least one component manufactured in accordance with the process described in the foregoing. This assures in advantageous fashion that the structural element can be manufactured relatively simply, fast and, in particular, by automatization since any undesirable subsequent machining/erosion of already finished partial surfaces of the component or, respectively, of the structural element is reliably prevented. For example, the manufacture of drawn rotor blades, such as, for example, of blades on bladed disks ("blisks") or bladed rings ("blings"), can be done through automatization. By means of the systematic application of a metallic layer on the already finished or nearly finished partial component surface of the component or, respectively, of the structural element, these surfaces will be reliably protected from any undesirable erosion during a subsequent electrochemical machining process.

The process in accordance with the invention is being used in the manufacture and repair of structural turbine elements made of alloys on nickel, cobalt, iron or titanium basis, in particular in the manufacture and repair of blade profiles.

An additional use of the process in accordance with the invention is the manufacture and repair of structural turbine elements, in particular the manufacture and repair of integral rotor designs. This concerns in particular a rotor blade and a rotor disk consisting of a single piece (blisk) and rotor blades produced integrally with a bearing ring (bling).

Referring now specifically to FIG. 1, there is illustrated one area of application of the process in the electrochemical treatment of a component 10 in which sharp-edged borders between an already finished component surface 12 and a working surface 14 to be further processed by means of the electrochemical machining (i.e., electro-erosion) process are to be created. In this context, material is to be removed from the component 10 in the area of the processing surface 14 by means of a so-called electrochemical sinking process. To this end, the component 10 is circuited as anode. An electrode 20 is circuited as cathode and moved in the direction of the component 10 or, respectively, of the processing surface 14 as indicated by the arrow 22. In this context, the movement is done in pulsed fashion, but overall, the result is a direction of motion towards the processing surface 14. Moreover, the movement of the electrode 20 is such that the processing surface 14 and the electrode 20 will not touch each other, thereby preventing any short circuit. Instead, a gap 26 is provided between the processing surface 14 and the electrode 20 as indicated in FIG. 1. Prior to the application of an electrolyte 24, a layer 16, preferably made of a metal or a metal alloy, was applied to the areas of component 10 abutting the working surface 14, namely to the already finished or nearly finished partial component surfaces 12, with the layer 16 having a similar or the same electrochemical machining/electro-erosion behavior as the metallic component 10 or, respectively, the working surface. The application of the electrolyte 24 starts the electrochemical treatment process in the gap 26 or, respectively, between the electrode 20 and the working surface 14. Moreover, a complete or nearly complete removal or erosion of the layer 16 occurs so that, at the end of the treatment, a sharp-edged border area 28 will have been created between the working surface 14 and the partial component surface 12. In this respect, the thickness as well as the composition of the metal layer 16 are selected in such a way that no further erosion of the partial component surface 12 occurs through the electrochemical processing of the working surface 14.

FIG. 2 illustrates schematically the process in a second area of application or, respectively in a second embodiment. This involves the electrochemical processing of a component 10 by means of electrochemical machining ("ECM") or pulse electrochemical machining ("PECM"), with the component 10 in the embodiment at hand being the blade 18 of a rotor of a gas turbine. In this respect, the blade 18 is represented with its desired final contour. One recognizes that the blade 18 still has a preliminary contour 30 that is to be machined/eroded by means of the aforementioned treatment processes. In this regard the preliminary blade contour 30 corresponds to the working surface 14 and has an irregular grinding allowance. The allowance is very limited, particularly at the ends of blade, so that no further removal or erosion may occur in these areas. In this respect, these areas correspond to the finished or nearly finished partial component surfaces 12. Again, a layer 16 is applied to these partial component surfaces 12. Moreover, one recognizes that in the embodiment in accordance with FIG. 2, two electrodes 20 are circuited as cathodes and the component 10 or, respectively the blade 18, as anodes. The two electrodes 20 are moved in the direction of the arrows 22 on both sides towards the component 10 to be processed. The electrolyte 24 is guided through to the electrochemical processing in the gap between the electrode 20 and the component 10, 18 or, respectively, the working surfaces 14, 30. The ends of the blade 18 or, respectively, the partial component surfaces 12 are protected from any additional electrochemical machining or electro-erosion by the metal layers.

FIG. 3 shows a third application option of the process for the treatment and/or repair of a metal component 10. There, it involves the subsequent finishing of a blade 34 of a turbine blade 18 attached to a blade mounting 32 by means of joining. One can see that a bulge 38 has formed in the area of a joint 36 that needs to be removed in order to achieve the final contour of the blade 18 or, respectively, of the component 10. To that end, the removal or erosion of the bulge 38 occurs by means of an electrochemical treatment process, in particular of an ECM treatment. For the electrochemical processing, two electrodes 20 are circuited as cathodes and the component 10 or, respectively, the blade 18 as anodes and connected accordingly to a power supply 40. Again, a gap 26 is created between the electrodes 20 and the blade 18 through which an electrolyte 24 is guided. Moreover, one can recognize that the surfaces of the electrodes 20 facing the blade 18 have a contour that corresponds to the final contour of the blade 18 to be treated. Prior to the electrochemical treatment of the blade 18, finished partial component surfaces 12 were again coated with the layer 16. In the embodiment shown, they involve the already finished surfaces of the blade mounting 32. During the subsequent electrochemical treatment of the component 10 or, respectively, of the blade 18, a complete removal or erosion of the layer 16 as well as of the bulge 38 is carried out. In addition, working surfaces 14 of the blade that are yet to be treated are given their final contour as well. The application of the metallic layer 16 makes the treatment of the entire surface of the blade 18 possible, resulting in a seamless final contour of the blade 18. In the examples of an embodiment described above, the metallic layer 16 may be made of an alloy based on nickel, cobalt, iron or titanium. The same applies to the material of the component 10 or, respectively, of the blade 18.

Furthermore, it becomes clear that the described process can be used not only for the manufacture of turbine components but also for their repair since abutting partial component surfaces that are not to be processed are reliably protected from any undesirable electrochemical machining.

It will be appreciated by those skilled in the art having the benefit of this disclosure that this process for the production and use of a protective layer is directed to a component produced by means of the process in accordance with the invention as well as being directed to the use of the process in accordance with the invention. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A process for one of manufacturing and repairing a metal component of a rotating machine, the metal component having a known electrochemical erosion behavior and including a first section with abutting surfaces defining a joint and a second section having a substantially finished surface disposed adjacent to the first section, wherein the process comprises the following steps:
   a) permanent joining of the abutting surfaces defining the joint to one another, whereby a first joint contour is created on the surface of the first section, the first joint contour including a bulge created by the joining process that projects above a desired final contour in a localized area proximate the joint;
   b) application of an electrically conductive protective layer having a predetermined thickness on at least one area of the second section adjacent the first section, wherein the protective layer is one of
      a metal; and
      a metal alloy;
      having an electrochemical erosion behavior that has a known relation to the electrochemical erosion behavior of the metal component, wherein the predetermined thickness of the electronically conductive protective layer is selected to be substantially completely eroded during electrochemical processing of the first section; and
   c) electrochemical processing of the first section and of the protective layer by guiding an electrolyte through a gap created between the first section and the protective layer, which are circuited as anodes, and surfaces of a pair of electrodes, which are circuited as cathodes, the electrodes having a contour that corresponds to the desired final contour of the component, with the first joint contour being eroded to define a second joint contour, wherein the bulge is substantially completely removed from the localized area proximate to the joint in the second joint contour, and the protective layer being substantially completely eroded to the substantially finished surface by the electrochemical processing.

2. A process in accordance with claim 1, wherein the component is a turbine component made of alloys based on at least one of nickel, cobalt, iron and titanium.

3. A process in accordance with claim 1, wherein the process is used for the manufacture and repair of blade profiles on turbine blades.

4. A process in accordance with claim 1, wherein the component is a turbine component being one of a blisk ("bladed disk") and a bling ("bladed ring") of integral rotor design.

5. A process in accordance with claim 1, further comprising electrochemical processing of at least a portion of the second section not covered by the protective layer to a substantially finished surface.

6. A process in accordance with claim 5, wherein the entire surface of the component is eroded to a substantially finished surface contour.

7. A process for one of processing and repairing a metal component having a known electrochemical erosion behavior and including at least one substantially finished partial component surface and at least one working surface to be further processed by an electrochemical processing method and abutting the substantially finished partial component surface, wherein the process comprises the following steps:
   a) application of an electrically conductive protective layer having a predetermined thickness on at least one area of the substantially finished partial component surface abutting the working surface to be further processed, wherein the protective layer is one of
   a metal; and
   a metal alloy;
   having an electrochemical erosion behavior that has a known relation to the electrochemical erosion behavior of the metal component, wherein the predetermined thickness of the electrically conductive protective layer is substantially completely eroded during electrochemical processing of the at least one working surface; and
   b) electrochemical processing of the working surface and of the protective layer, with the protective layer being substantially completely eroded to the substantially finished partial component surface by the electrochemical processing.

* * * * *